United States Patent [19]
Reccia et al.

[11] Patent Number: 6,039,247
[45] Date of Patent: Mar. 21, 2000

[54] SECURE, STORED-VALUE SYSTEMS AND METHODS OF TRANSFERRING MONETARY VALUES IN ONE OR MORE TRANSACTIONS TO A SPECIFIC RECEIVING DEVICE

[75] Inventors: Ralph Reccia, Orange; Arthur C. Smith, Santa Monica, both of Calif.

[73] Assignee: Xico, Inc., Chatsworth, Calif.

[21] Appl. No.: 08/994,390

[22] Filed: Dec. 19, 1997

[51] Int. Cl.[7] .................................................. G06F 17/60

[52] U.S. Cl. ...................... 235/379; 235/380; 235/493; 902/2; 902/4; 902/28

[58] Field of Search ................................. 235/379, 380, 235/381, 382.5, 449, 451, 492, 493; 902/1, 2, 4, 26, 27, 28

[56] References Cited

U.S. PATENT DOCUMENTS

| | | | |
|---|---|---|---|
| 4,436,992 | 3/1984 | Simjian | 235/381 |
| 4,575,622 | 3/1986 | Pellegrini | 235/382 |
| 4,585,929 | 4/1986 | Brown et al. | 235/449 |
| 4,626,670 | 12/1986 | Miller | 235/436 |
| 4,630,201 | 12/1986 | White | 235/379 X |
| 4,669,596 | 6/1987 | Capers et al. | 235/381 X |
| 4,731,575 | 3/1988 | Sloan | 235/381 X |
| 4,795,892 | 1/1989 | Gilmore et al. | 235/381 |
| 5,068,891 | 11/1991 | Marshall | 379/91 |
| 5,146,067 | 9/1992 | Sloan et al. | 235/381 |
| 5,267,149 | 11/1993 | Anada et al. | 235/379 X |
| 5,521,362 | 5/1996 | Powers | 235/380 |
| 5,877,482 | 3/1999 | Reilly | 235/380 |

*Primary Examiner*—Michael G Lee
*Attorney, Agent, or Firm*—Patrick F. Bright

[57] ABSTRACT

Methods and systems for encoding encrypted monetary values onto transfer vehicles include one or more payment, encoder, and encrypter devices, and, associated with each designated receiving device such as a wireless telephone, a reader, decoder, and decrypter device for deciphering the data from the transfer vehicles, and, under appropriate conditions, for transferring the monetary values encoded and encrypted on the transfer vehicle into memory associated with the designated receiving device. Once such monetary values are transferred to the receiving device, the transfer vehicle cannot be used to transfer the same monetary value again even though the transfer vehicle is not modified during the transfer process.

5 Claims, 3 Drawing Sheets

SECURE, STORED-VALUE SYSTEMS AND METHODS OF TRANSFERRING MONETARY VALUES IN ONE OR MORE TRANSACTIONS TO A SPECIFIC RECEIVING DEVICE

This invention relates to methods and systems for encoding encrypted monetary values onto transfer vehicles using one or more payment/encoder/encrypter devices, and for decoding, decrypting and transferring these monetary values from such transfer vehicles into the monetary value memory of a particular device that provides goods or services to a user in exchange for payments drawn from this memory. In these systems and methods, the transfer vehicle loses its value at the point of transfer without having to be altered by the receiving device. Examples of devices that can employ such a value-transfer method are: wireless telephones, pay televisions, utility meters, postage meters, and other devices which deliver to a user a given quantity of goods or services in exchange for payment taken from a monetary value memory stored in the device. In some embodiments, the payment drawn from the monetary value memory of the device is based upon a rate table stored within the device, or accessible by the device.

In preferred embodiments, these systems include one or more payment/encoder/encrypter devices. In exchange for a monetary payment, as, for example, payment by credit card, these devices encode, on a suitable transfer vehicle such as a plastic card bearing a magnetic stripe on which data can be encoded by one or more available techniques, certain encrypted data. This encrypted data includes, at a minimum, a unique identifier for a specific receiving device that is designated to receive, and store in memory, the monetary sum or value encoded on the transfer vehicle, the monetary sum or value to be transferred to the receiving device, and a unique transaction number.

The encoder/encrypter combines, e.g. by concatenation into one long number, and encrypts: (1) the unique identifier for the specific device designated to receive the monetary value encoded on the transfer vehicle; (2) the monetary value to be encoded on the transfer vehicle; and (3) a unique transaction number associated with the specific encoder/encrypter; and places this encrypted data on a transfer vehicle for transfer to the designated receiving device.

In preferred embodiments, the encoder also includes one or more generators for providing unique transaction numbers to be associated with each transaction, and for providing a unique identifier for a given encoder device.

U.S. Pat. No. 4,585,929, issued Apr. 29, 1986, entitled MAGNETIC STRIPE MEDIA READER MODULES AND CARRIERS FOR MAGNETIC HEAD READER/ENCODERS FOR SUCH MEDIA and U.S. Pat. No. 4,626,670, issued Dec. 2, 1986, entitled METHOD AND SYSTEM FOR DECODING TIME-VARYING, TWO-FREQUENCY, COHERENT-PHASE DATA, which are assigned to the same assignee as this application, disclose suitable reader modules and encoder modules for the encoded, encrypted data to be placed on the transfer vehicles, and methods and systems for decoding such data from such transfer vehicles rapidly and accurately. Commercial embodiments of these readers, encoders and decoders useful in the practice of this invention are the following: Xico Models 4661SE Encoder and Model 7091SA Reader.

The receiving device designated to receive the monetary sum or value encoded on a transfer vehicle includes a data reader, data decoder and data decrypter. The reader/decoder/decrypter device reads encrypted data encoded on the transfer vehicle, decrypts this data, and sends the decrypted data to the central processor of the receiving device.

The receiving device includes a central processor, e.g. a microprocessor, and suitable data memory or storage devices accessible by the processor. These storage devices include memory for receiving and storing a serial number or other designator unique to the receiving device, memory for receiving and storing monetary values transferred to the receiving device, memory for receiving and storing a unique transaction number associated with a discrete transfer of monetary value to the receiving device, and, optionally, memory for receiving and storing designators for bad encoder/encrypter devices that are not authorized, or no longer authorized, to provide monetary value to be transferred to the receiving device. The receiving device processor compares the decrypted data received from the reader/decoder/decrypter with data previously stored in the memory of the receiving device to verify if it is new data.

In preferred embodiments, connected to the encoder are a point-of-sale (POS) or personal computer (PC) terminal for transferring data to, and receiving data from, the encoder/encrypter. Connected to the PC or POS is a keyboard for inputting information via a suitable connector to the PC or POS. Also connectable to the PC or POS, via a suitable path, is any one of the receiving devices. In the memory of each receiving device is a unique identifier for that device. In preferred embodiments, the receiving device initially transfers its identifier to the encoder/encrypter via direct connection to the PC or POS.

In operation, in exchange for a user's payment, a payment/encoder/ encrypter device places on the magnetic stripe, or other suitable location of a transfer vehicle, encrypted data that includes, at a minimum, the unique identifier number of the receiving device, the monetary sum or value to be transferred to that receiving device, and the unique transaction identifier for that transaction. At the receiving device, a user enters the transfer vehicle into the reader/decoder/decrypter of the receiving device to transfer the monetary value to that device.

The receiving device reads, decodes and decrypts the encrypted data, and compares the decrypted data with the data stored in the receiving device, including the device's unique identifier and the transaction number. If the decoded, decrypted data includes the correct, unique identifier of the receiving device, and if the transaction number in the decrypted data does not match any transaction number previously stored in the memory of the receiving device, the receiving device adds the decrypted monetary value to the value memory of the receiving device, and stores the associated transaction number in the transaction memory of the receiving device. However, if the decrypted transaction number is already stored in the memory of the receiving device, or if the decrypted receiving device identifier does not match the correct receiving device identifier, the receiving device will not add the monetary value to the value memory of the receiving device, nor will the receiving device store the transaction number decoded from the transfer vehicle in the receiving device's transaction number memory.

Receiving devices suitable for use with the systems and methods of this invention are described in U.S. patent application Ser. No. 60/028,364, filed Oct. 11, 1996, and entitled "REPROGRAMMABLE WIRELESS LOCAL LOOP PHONE CAPABLE OF EMULATING A WIRELINE PHONE". By this reference, the entire specification, claims and drawings of that application are incorporated herein as though fully set forth here.

The transfer vehicle, though preferably a plastic card bearing a magnetic stripe with encoded data in the stripe, can be any vehicle for carrying and transferring encrypted, stored data. Examples of other suitable transfer vehicles are chip cards, smart cards, RFID cards, optical cards and bar code cards.

In preferred embodiments, the unique transaction number included in the encrypted data is generated within an encoder/encrypter when a monetary value is encrypted and encoded on a transfer vehicle. Preferably, such a unique transaction number for association with the monetary value to be placed on a transfer vehicle comprises a concatenated combination of a serial number or other identifier unique to a specific encoder, with a monotonically increasing number generated by or within that encoder, e.g. the current value of a clock or counter. These new systems may therefore include as many encoders as desired, provided each encoder has a unique serial number and contains such a number generator.

If an encoder is stolen, lost or diverted, receiving devices in the system can be programmed or otherwise adjusted to reject monetary values from transfer vehicles encoded by such encoders, preferably by storing the serial numbers of the bad encoders in a suitable memory of all receiving devices.

In preferred embodiments, each receiving device has a unique serial number or other identifier stored in memory within the receiving device itself by any suitable means. In these embodiments, the receiving device is connected, via a suitable path, to an encoder/encrypter when a transfer vehicle is first encoded with encrypted monetary value to be transferred to that receiving device. The encoder/encrypter initially receives the unique receiving device identifier from that device, and encodes that identifier on a transfer vehicle. That transfer vehicle may thereafter receive additional discrete monetary values from any encoder in the system in the absence of the particular receiving device, provided the encoder can read the data encoded on the transfer vehicle. If an encoder cannot read such data, or if the transfer vehicle is lost, the particular receiving device must again be connected to an encoder to place its unique identifier on the transfer vehicle.

In preferred embodiments, memory or storage devices in a receiving device for receiving and storing transaction numbers and bad encoder numbers are EEPROMs. Such devices provide non-volatile memory suitable for data storage. However, any device suitable for storing data and for responding to interrogation about its stored data can provide such nonvolatile memory.

BRIEF DESCRIPTION OF THE DRAWINGS

The invention can better be understood by reference to the drawings in which.

DETAILED DESCRIPTION OF THE PREFERRED EMBODIMENT

Figure 1:
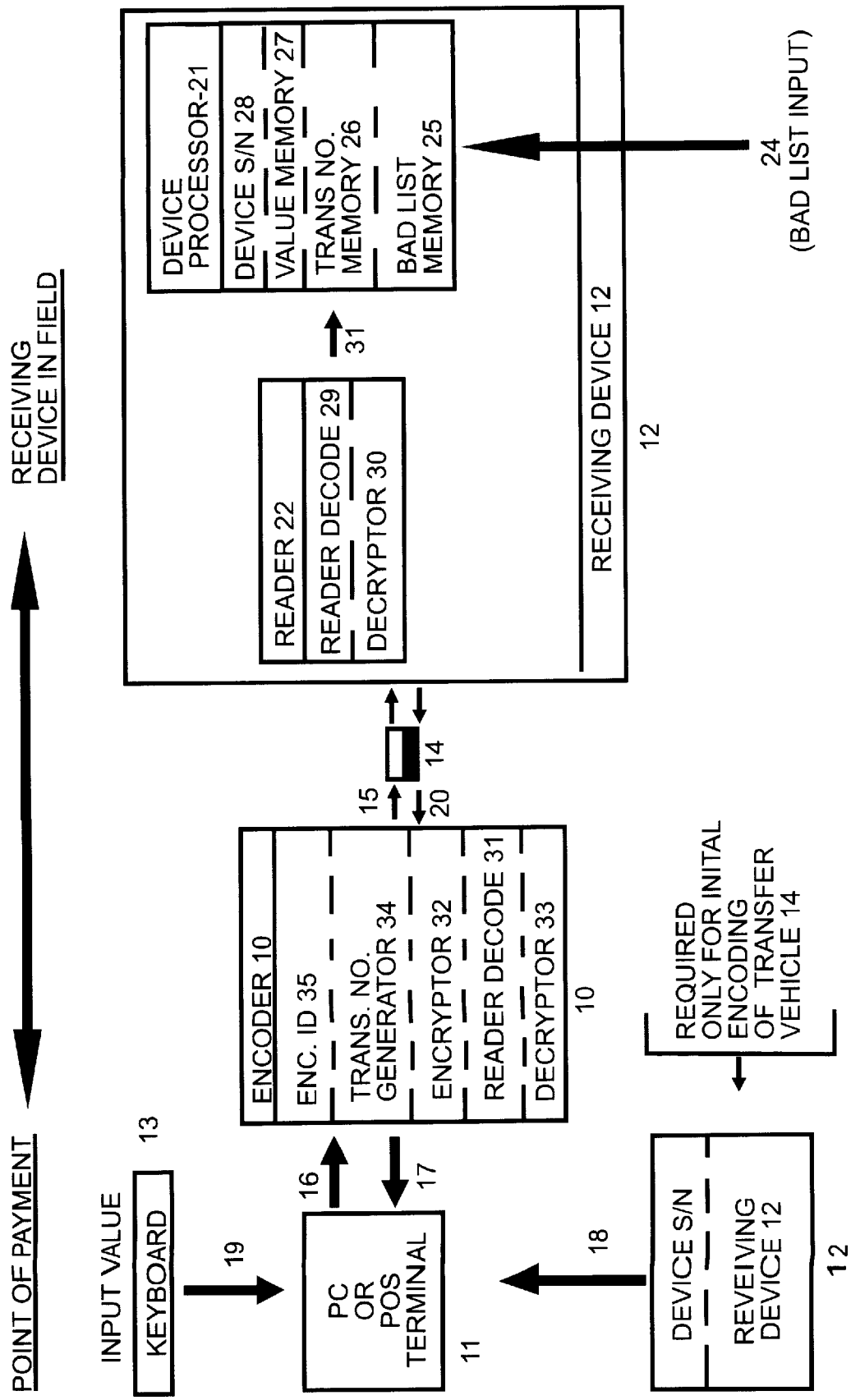
FIG. 1 shows, in block function diagram form, a preferred embodiment of a secure, stored-value transfer system.

In FIG. 1, encoder/encrypter 10 is located at a suitable point of payment for a transfer vehicle to provide secure, stored-value transfer of a monetary value to a designated receiving device. Keyboard 13 inputs pertinent data to PC or POS 11 via path 19. Receiving device 12 inputs its unique identifier number for encoding a transfer vehicle therewith via path 18 to terminal 11. Terminal 11 passes this data on path 16 to encoder/encrypter 10.

Encoder/encrypter 10 includes encrypter 32 and decrypter 33. Encrypter 32 combines and encrypts, at a minimum, a unique identifier number for each receiving device, a monetary value to be transferred to that device, and a unique transaction number associated with that transaction. Encoder/encrypter 10 also includes a generator 34 for unique transaction numbers, and memory 35 for the encoder identifier. The encoder combines a unique identifier for a particular receiving device, a monetary value and an associated unique transaction number, then encrypts and encodes this encrypted data on transfer vehicle 14, a magnetic-stripe bearing card, via path 15. Encoder/encrypter 10 also includes reader/decoder 31 and decrypter 33, which read, decode, decrypt and verify that the data encoded on transfer vehicle 14 is correct, via path 15. Transfer vehicle 14 is conveyed to receiving device 12, such as a wireless telephone at a business or private residence, for transfer of the encoded monetary sum or value on vehicle 14 to device 12.

Receiving device 12 includes reader 22, decoder 29, decrypter 30, and processor 21. Reader 22 reads, decoder 29 decodes, and decrypter 30 decrypts the data encoded on transfer vehicle 14. Decrypted data passes on path 31 to processor 21 where the unique identifier number of the receiving device, the unique serial number of the encoder, and the unique transaction number, are compared to data stored in memories associated with processor 21.

If the unique receiving device number in the decrypted data matches the correct receiving device number in memory 28 of processor 21, and if the transaction number in the decrypted data is not stored in transaction number memory 26, and if the encoder serial number is not stored in bad list memory 25, then the decrypted monetary value will be added to the balance stored in value memory 27, and the associated transaction number will be stored in transaction number memory 26. A list of unacceptable or bad list encoders is input to bad encoder memory 25 on path 24.

Figure 2:
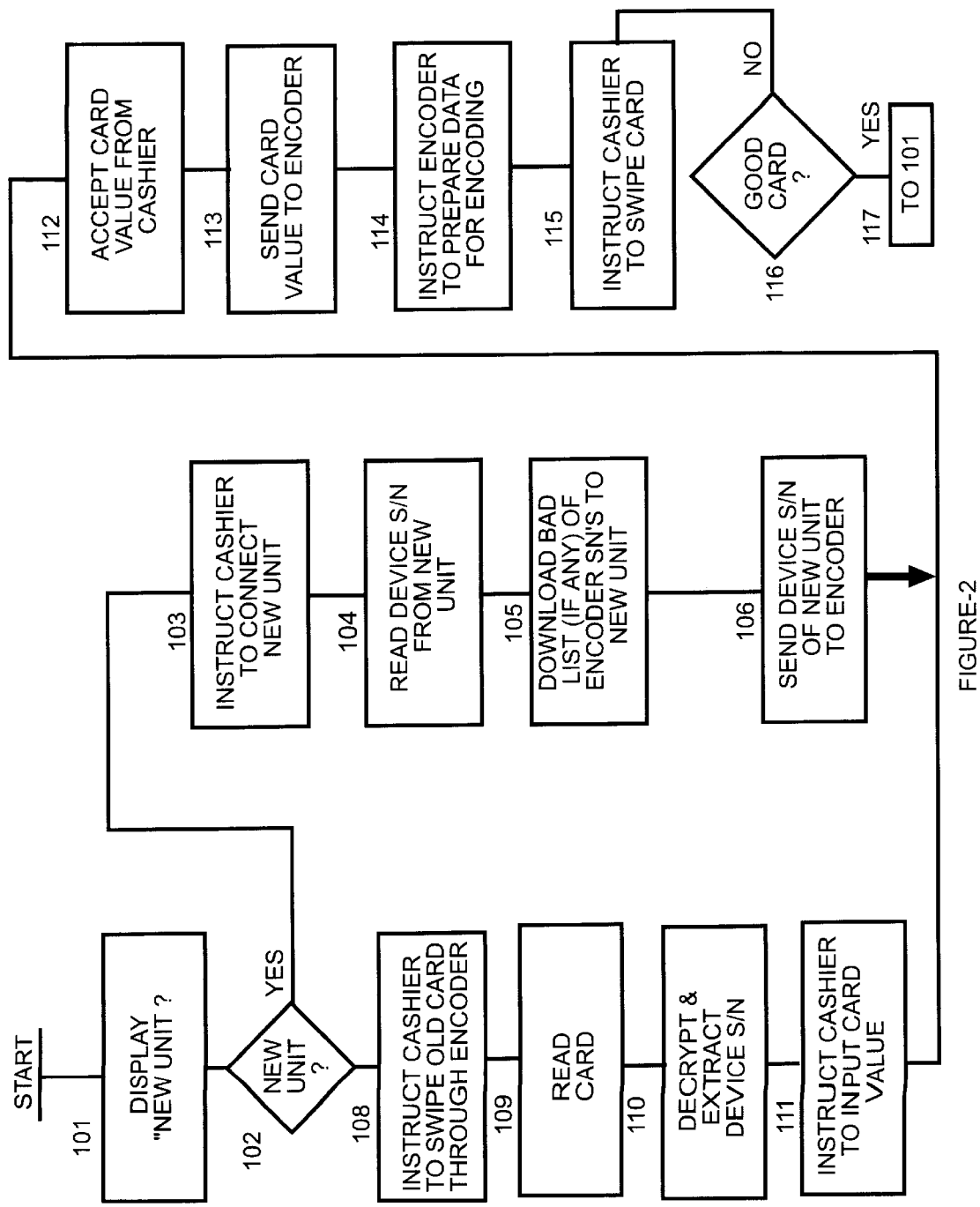
FIG. 2 shows a flow chart of an embodiment of a process for encoding a transfer vehicle.

FIG. 2 shows a flow chart for encoding encrypted data onto a suitable transfer vehicle. This data includes, at a minimum, a unique identifier for a receiving device, a monetary value to be transferred to the receiving device, and a unique transaction identifier associated with the transaction. At blocks 101 and 102, a personal computer (PC) or POS terminal controlling a transfer vehicle encoder issuer is instructed, in response to a prompt, and with suitable I/O units, that a new transfer vehicle for a new receiving device is being sold, or that an old transfer vehicle for an old, i.e. existing receiving device is being re-encoded. If the answer is YES, i.e. new, then a new receiving device is connected to the PC at block 103. After connection, the serial number of this receiving device is read at block 104. At block 105, a bad encoder list, if any, is downloaded into the receiving device. Such a list contains the serial numbers or other identifiers of lost, stolen or otherwise unaccounted-for encoding devices. At block 106, the receiving device serial number is sent to the encoder at block 111.

If the response is NO, i.e. old, a prompt at block 108 calls for an existing transfer vehicle to be swiped through the encoder. The encoder reads the card data at block 109 and, at block 110, decrypts and extracts the receiving device serial number from the data and sends it to block 111.

At block 111, the cashier is instructed to input a monetary value to be encoded on the transfer vehicle. At block 112, the PC/POS terminal accepts this value. At block 113, this value is sent to the encoder. At block 114, the encoder prepares the data for encoding by generating a unique transaction number, e.g. the encoder serial number concatenated with a monotonically ascending number, by concatenating this number with the monetary value and the receiving device identifier, and by encrypting the resulting number. At block 115, the transfer vehicle is swiped through the encoder. The encoder encodes the data onto the transfer vehicle, reads what has just been encoded, and compares the read data with the intended encoded data at block 116. If the encoding is not valid, the cashier is instructed to again swipe the transfer vehicle through the encoder. If valid, at block 117 the PC/POS terminal returns to block 101 for new transactions.

Figure 3:
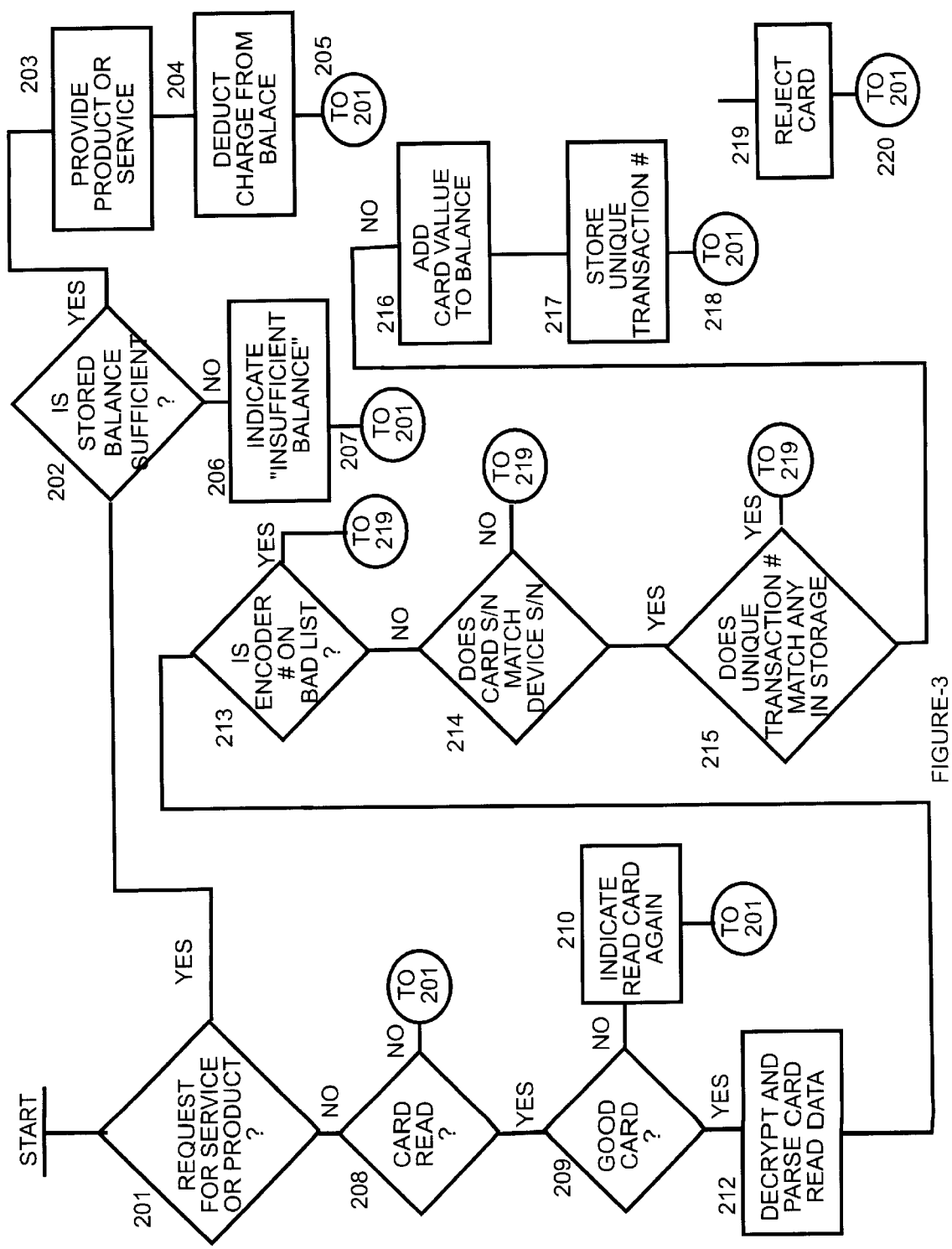
FIG. 3 shows a flow chart of an embodiment of a process for delivering a transfer vehicle to a receiving device, for reading, decoding and decrypting data from the transfer vehicle, and for transferring discrete monetary values into memory associated with the receiving device under appropriate circumstances.

FIG. 3 is a flow chart of a process for decoding a transfer vehicle at a receiving device. At block 201, the receiving device asks whether a request for a service or product has been made. Absent such a request, at block 208, the receiving device asks whether a transfer vehicle has been read. If not, the device returns to block 201.

If a request for a service or a product has been made, at block 202 the receiving device determines whether the monetary balance stored in memory is sufficient to pay for the requested service or product. If it is, then the device provides the requested service or product at block 203, and, at block 204, deducts from the monetary balance in the device's memory the sum representing the charge for the requested service or product. Thereafter, the device returns to block 201.

If, at block 202, there is an insufficient monetary balance in the device's memory to pay for the requested service or product, then the device goes to block 206, which outputs a message to this effect. The device then returns to block 201.

If a transfer vehicle has been read at block 208, and if at block 209 the read is found to be intelligible, then the device goes to block 212. If the read at block 208 was unintelligible, the device asks that the vehicle be reread at block 210. Absent an intelligible read, the device reverts to block 201.

Following an intelligible read at block 209, the data on the vehicle is decrypted and parsed at block 212 into an encoder number, a device serial number, a unique transaction number, and a monetary value. At block 213, if the encoder number data from the vehicle is on the bad list stored in the device's memory, the device rejects the transfer vehicle at block 219, and reverts to block 201. At block 214, if the device serial number read from the vehicle is not the correct device serial number, the device rejects the vehicle at block 219, and reverts to block 201. At block 215, if the unique transaction number read from the vehicle matches a transaction number stored in the memory of the device, the device rejects the vehicle at block 219, and reverts to block 201.

At block 216, if the encoder number in the recorded, decrypted data is not on the bad list, and if the device serial number on the vehicle is correct, and if the unique transaction number is not stored in the memory of the receiving device, then the decoded monetary value is added to the balance in the memory of the device. At block 217, the unique transaction number associated with the newly added monetary value is stored in the memory of the receiving device. Thereafter, the device reverts to block 201.

What is claimed is:

1. A system for transferring encoded, encrypted monetary or other value from a payment, encoder and encrypter device to a specific receiving device that includes a reader, decoder and decrypter using one or more discrete, portable transfer vehicles that carry said value includes:

(a) at least one payment, encoder and encrypter device that encodes, encrypts and places monetary or other value onto a transfer vehicle, said value being encrypted and encoded with, at a minimum, a unique identifier for said specific receiving device designated to receive and store in memory said monetary value encoded on said transfer vehicle, and a unique transaction identifier associated with each transaction; and (b) a reader, decoder and decrypter device associated with said specific receiving device for reading, decoding and decrypting the encrypted, encoded data on said transfer vehicle, for transferring said decrypted data to the processor of said specific receiving device for comparing said decrypted data to data stored in memory associated with said specific receiving device, and for transferring into the monetary value memory of said specific receiving device the monetary value from said transfer vehicle if said encoded, encrypted data includes the correct identifier for said specific receiving device and if said unique transaction identifier associated with said transaction is not previously stored in memory associated with said specific receiving device.

2. The system of claim 1 further comprising, at least one discrete portable transfer vehicle for each said specific receiving device for transferring monetary value in one or more discrete transactions to said specific receiving device that includes memory for storing said value, said transfer vehicle having encoded thereon encrypted data representing, at a minimum, a unique identifier for said specific receiving device, said monetary value, and for each of said transactions, an associated unique transaction identifier.

3. A method for transferring monetary value encoded on a portable, discrete transfer vehicle from a payment device to a specific receiving device that includes memory for storing data that represents said monetary value comprising:

encoding on a transfer vehicle, in encrypted form, data representing, at a minimum, a unique identifier for said specific receiving device, a monetary value to be transferred in the form of one or more transactions to said specific receiving device, and for each transaction, an associated unique transaction identifier;

conveying said transfer vehicle to said specific receiving device; and delivering said transfer vehicle to said specific receiving device for reading, decoding and decrypting the data from said transfer vehicle and for transferring said monetary value into memory associated with said specific receiving device if, and only if, the unique identifier in the decoded data matches the unique identifier of said specific receiving device, and the unique transaction identifier in the decoded data is not previously stored in memory associated with said specific receiving device.

4. The system of claim 1 further comprising, associated with said receiving device, memory for receiving and storing designators for encoder/encrypter devices that are not authorized, or are no longer authorized, to provide monetary value to be transferred to said receiving device.

5. The method of claim 3 further comprising:

encoding on said transfer vehicle, in encrypted form, a designator for the encoding device;

storing in memory associated with said receiving device at least one designator for encoding devices that are not authorized, or are no longer authorized, to provide monetary value to be transferred to said receiving device;

in said receiving device, comparing the encoding device designator on said transfer vehicle to the stored designators for encoding devices that are not authorized, or are no longer authorized, to provide monetary value to be transferred to said receiving device; and refusing to transfer monetary value from said transfer vehicle into said memory associated with said receiving device if said encoding device designator on said transfer vehicle is not authorized, or is no longer authorized, to provide said monetary value to be transferred to said receiving device.

* * * * *